Patented Apr. 28, 1936

2,038,529

UNITED STATES PATENT OFFICE 2,038,529

SYNTHETIC TANNING AGENT

Hermann Schuette and Richard Alles, Mannheim, Germany, assignors to I. G. Farbenindustrie Aktiengesellschaft, Frankfort-on-the-Main, Germany No Drawing. Application May 28, 1934, Serial No. 727,913. In Germany June 3, 1933

11 Claims. (Cl. 149—5)

The present invention relates to improved synthetic tanning agents and a process of producing same.

We have found that tanning agents which have, in addition to an excellent tanning action and filling power, a hitherto unattained stability to light and to storing can be obtained by combining in an acid, preferably aqueous medium crystalline, water-soluble, glue-precipitating condensation products containing sulphonic groups derived from ketones and from phenols which are not substituted in para-position to the hydroxyl groups, with condensation products derived from urea and formaldehyde.

As ketone condensation products may be mentioned for example the products obtainable by the condensation of acetone, methyl ethyl ketone, diethyl ketone, methyl propyl ketone, acetophenone or cyclohexanone or methylcyclohexanone with phenols (which term comprises especially monohydric phenols such as phenol itself, meta-cresol, ortho-cresol and their derivatives) in the presence of condensing agents, such as hydrochloric acid and dilute sulphuric acid, and rendered water-soluble by sulphonation. The sulphonation product of dihydroxydiphenyl-dimethylmethane described in Example 2 of U. S. Patent No. 1,414,045 is especially suitable.

The sulphonation products (which may contain one or more sulphonic groups) thus obtained are combined with the urea-aldehyde condensation products either by combining the sulphonic acid with a product obtained by condensation of urea with formaldehyde with or without the addition of condensing agents in an acid medium, or advantageously, by producing the urea condensation product in the presence of the sulphonic acid. A special addition of acid is unnecessary because the acidity of the sulphonic acid is sufficient to render possible the combination of the two condensation products.

Instead of starting from urea and formaldehyde, the methylol compounds obtainable therefrom may be employed. Thus for example a mixture of the crystallized sulphonic acid of the condensation product derived from acetone and phenol may be dissolved with a freshly prepared methylol or dimethylol urea in water, the combination of the two components being effected by heating at from 70° to 90° C.

The combination of the phenol-ketone condensation products containing sulphonic groups with the urea-formaldehyde condensation products (or the components building up the latter) is effected by bringing them together in aqueous acid media at ordinary or slightly elevated temperature, for example between about 30° and 50° C. while agitating well for some time in order to secure a fine division of the product, and subsequently warming the mass to a temperature above about 50° C. whereby dissolution takes place. The proportions in which urea and formaldehyde are combined with the sulphonated phenol-ketone condensation product may vary to a certain degree; for example with 1 molecular proportion of a disulphonic acid of the type of 4.4'-dihydroxydiphenyldimethylmethane - 3.3' - disulphonic acid are suitably combined with up to about 1.5 molecular proportions of urea and up to about 1.5 or 2 molecular proportions of formaldehyde.

While it is possible to prepare dry combinations by cautiously evaporating the water in the vacuum, it is usually preferable to employ the aqueous reaction mass as it is obtained for preparing tanning baths, preferably after adjusting a suitable degree of alkalinity.

The tanning agents obtainable according to the present invention may be employed as such or together with other tanning (or "non-tanning" agents such as oxalic acid), for example with natural vegetable tanning agents such as sumac or gallnut extracts, with mineral tanning agents such as chromium salts or with other synthetic tanning agents.

Leathers prepared by means of the said tanning agents are distinguished by their fastness to tearing, their white color, an agreeable, flexible touch, an excellent fastness to light and to storing. They are especially suitable as bright upper shoe leathers or leathers for making portfolios.

The tans according to the present invention may be used with advantage for brightening chrome leather and to remove the undesired greenish shade of such leather. The tans are especially suitable for tanning hides of reptiles, such as chameleons, lizards and serpents, the original shades and patterns of the said hides being well preserved.

The following examples will further illustrate the nature of the present invention but the invention is not restricted to these examples. The parts are by weight.

*Example 1*

388 parts of free 4.4'-dihydroxydiphenyldimethylmethane-3.3'-disulphonic acid (prepared according to Example 7 of the German Patent 409,984) are dissolved in a solution of 90 parts urea in 325 parts of water. A solution of 200 parts of 30 per cent formaldehyde in 150 parts of water is allowed to flow slowly (about in the course of an hour) into the said solution at between 45° and 50° C., the reaction mixture being contained in a vessel provided with a reflux condenser. While the said solution of formaldehyde is allowed to flow in, the mass is stirred intensely and rapidly whereby the precipitate of a colorless reaction product (which is probably a condensation product of formaldehyde with urea) is formed in a dispersion as finely divided and homogeneous as possible; hereby it is in a form most suitable for the further combination with the sulphonic acid described above. The foam-like mass formed containing but a little liquid is stirred for another several hours at between 35° and 40° C. and subsequently for about 12 hours at ordinary temperature until the smell of formaldehyde has disappeared. By warming for some time to from about 60° to 90° C. the mass is converted into a clear yellow-brown viscous solution. A solution of 12 parts of crystallized oxalic acid in 88 parts of water is added thereto and the mixture is adjusted to the acidity desired by careful addition of aqueous caustic soda of 40° Bé.

Leather prepared by means of the said tan is colorless and resistant to tearing; it has an agreeable, flexible touch and is very fast to light; therefore leathers tanned by means of the said product are suitable as bright upper shoe leathers or leathers for portfolios. The tan may also be used for brightening chrome leather and it is excellently suitable for tanning reptile hides.

Example 2

402 parts of free 4.4'-dihydroxydiphenylmethylethylmethane-3.3'-disulphonic acid (obtainable by sulphonating by means of chlorosulphonic acid, in a manner analogous to that described in Example 7 of the German Patent 409,984, 4.4'-dihydroxydiphenylmethylethylmethane, obtainable by condensing 2 molecular proportions of phenol with 1 molecular proportion of methylethylketone in the presence of gaseous hydrochloric acid) are dissolved in a solution of 60 parts of urea in 294 parts of water. The solution is kept under reflux condensation and a solution of 125 parts of 30 per cent formaldehyde in 100 parts of water is allowed to flow thereto at between 45° and 50° C. in the course of ¾ hour while stirring. The mass is worked up as described in Example 1.

Example 3

402 parts of free 4.4'-dihydroxydiphenylmethylethylmethane-3.3'-disulphonic acid are dissolved in a solution of 90 parts of urea in 325 parts of water, whereupon a solution of 220 parts of 30 per cent formaldehyde in 150 parts of water is allowed to flow thereto at between 45° and 50° C. in the course of 1¼ hours while stirring and keeping the mass under reflux condensation. The reaction mass is worked up as described in Example 1.

Instead of the disulphonic acid used according to Examples 2 and 3 equimolecular proportions of free 4.4'-dihydroxydiphenyldiethylmethane-3.3'-disulphonic acid or free 4.4'-dihydroxydiphenylmethylpropylmethane-3.3'-disulphonic acid may be used.

Example 4

450 parts of free 4.4'-dihydroxydiphenylmethylphenylmethane-3.3'-disulphonic acid (obtainable by sulphonating with chlorosulphonic acid, in a manner analogous to that described in Example 7 of the German Patent 409,984, 4.4'-dihydroxydiphenylmethylphenylmethane, obtainable by condensing 2 molecular proportions of phenol with 1 molecular proportion of acetophenone in the presence of gaseous hydrochloric acid) are dissolved in a solution of 60 parts of urea in 294 parts of water. This solution is kept under reflux condensation and a solution of 125 parts of 30 per cent formaldehyde in 100 parts of water is allowed to flow in at between 45° and 50° C. while stirring in the course of 1¼ hours. The reaction mass is worked up as described in Example 1.

Example 5

450 parts of free 4.4'-dihydroxydiphenylmethylphenylmethane-3.3'-disulphonic acid are dissolved in a solution of 90 parts of urea in 325 parts of water. While stirring the mass and keeping it under reflux condensation a solution of 200 parts of 30 per cent formaldehyde in 150 parts of water is allowed to flow in at between 45° and 50° C. in the course of ¾ hour. The mass is worked up as described in Example 1.

Instead of the said disulphonic acid an equimolecular amount of free 4.4'-dihydroxydiphenylethylphenylmethane-3.3'-disulphonic acid may be employed whereby products of similar properties are obtained.

Example 6

430 parts of free bi-(4'-hydroxyphenyl-3'-sulphonic acid)-1.1-cyclohexane (obtainable by sulphonating with chloro-sulphonic acid bi-(4'-hydroxyphenyl)-1.1-cyclohexane, which may be produced according to Example 1 of the German Patent 484,739) are dissolved in a solution of 90 parts of urea in 325 parts of water. The mass is kept under reflux condensation and stirred and a solution of 200 parts of 30 per cent formaldehyde in 150 parts of water is allowed to flow in at from 45° to 50° C. in the course of 1¼ hours. The mass is worked up as described in Example 1. A solution is obtained which is turbid at ordinary temperature and becomes clear by warming and remains clear upon dilution with cold water.

Example 7

416 parts of free 4.4'-dihydroxy-3.3'-dimethyldiphenyldimethylmethane-5.5'-disulphonic acid (obtainable by sulphonating with chlorosulphonic acid, in a manner analogous to that described in Example 7 of the German Patent 409,984, 4.4'-dihydroxy-3.3'-dimethyldiphenyldimethylmethane, obtainable by condensing 2 molecular proportions of ortho-cresol with 1 molecular proportion of acetone in the presence of gaseous hydrochloric acid) are dissolved in a solution of 90 parts of urea in 325 parts of water. While stirring the mixture obtained and keeping it under reflux condensation a solution of 200 parts of 30 per cent formaldehyde in 150 parts of water is allowed to flow in slowly in the course of an hour at between 45° and 50° C. The mass is worked up as described in Example 1.

Instead of the said disulphonic acid equimolecular proportions of 4.4'-dihydroxy-3.3'-dimethyldiphenylmethylphenylmethane-5.5'-disulphonic acid or of bi-(4'-hydroxyphenyl-3'-methyl-5'-sulphonic acid)-1.1-cyclohexane may also be used.

All of the tanning agents obtainable according to the examples yield from clear to turbid deep blue colorations if an aqueous 1 per cent solution of ferric chloride be added to their dilute aqueous faintly acid solution.

What we claim is:—

1. The process of producing improved tanning agents, which comprises combining in an acid medium a crystalline, water-soluble, glue-precipitating condensation product containing at least one sulphonic group and derived from a ketone and a phenol not substituted in para-position to the hydroxyl group, with a condensation product derived from urea and formaldehyde.

2. The process of producing improved tanning agents, which comprises combining in an acid aqueous medium a crystalline, water-soluble, glue-precipitating condensation product containing at least one sulphonic group and derived from a ketone and a phenol not substituted in para-position to the hydroxyl group, with a condensation product derived from urea and formaldehyde.

3. The process of producing improved tanning agents, which comprises mixing in an acid aqueous medium a crystalline, water-soluble, glue-precipitating condensation product containing at least one sulphonic group and derived from a ketone and a phenol not substituted in para-position to the hydroxyl group, with a condensation product derived from urea and formaldehyde at a temperature ranging from ordinary temperature to 50° C. and warming the mass to a temperature above 50° C. until dissolution takes place.

4. The process of producing improved tanning agents, which comprises mixing in an acid aqueous medium a crystalline, water-soluble, glue-precipitating condensation product containing at least one sulphonic group and derived from a ketone and a phenol not substituted in para-position to the hydroxyl group, with urea, adding formaldehyde, allowing the mixture to react at a temperature ranging from ordinary temperature to 50° C. whereby a precipitate is formed and warming to a temperature above 50° C. until dissolution of the said precipitate takes place.

5. The process of producing improved tanning agents, which comprises dissolving free 4.4'-dihydroxydiphenyldimethylmethane 3.3'-disulphonic acid with urea in water, adding formaldehyde, allowing the mixture to react at a temperature ranging between ordinary temperature and 50° C. and warming to a temperature above 50° C. until dissolution of an intermediately formed precipitate takes place.

6. Improved tanning agents comprising a combination of a crystalline, water-soluble, glue-precipitating condensation product containing at least one sulphonic group and derived from a ketone and a phenol not substituted in para-position to the hydroxyl group, with a condensation product derived from urea and formaldehyde.

7. Improved tanning agents comprising an aqueous solution of a combination of a crystalline, water-soluble, glue-precipitating condensation product containing at least one sulphonic group and derived from a ketone and a phenol not substituted in para-position to the hydroxyl group, with a condensation product derived from urea and formaldehyde.

8. Improved tanning agents comprising a combination of a crystalline, water-soluble, glue-precipitating condensation product containing at least one sulphonic group and derived from a ketone and a monohydric phenol not substituted in para-position to the hydroxyl group, with a condensation product derived from urea and formaldehyde.

9. Improved tanning agents comprising a combination of a crystalline, water-soluble, glue-precipitating condensation product containing at least one sulphonic group and derived from a ketone and a phenol not substituted in para-position to the hydroxyl group, with urea and formaldehyde.

10. An improved tanning agent comprising a combination of 4.4'-dihydroxydiphenyldimethylmethane-3.3'-disulphonic acid with a condensation product from urea and formaldehyde.

11. An improved tanning agent comprising a combination of 4.4'-dihydroxydiphenyldimethylmethane-3.3'-disulphonic acid with urea and formaldehyde.

HERMANN SCHUETTE.
RICHARD ALLES.